United States Patent
Chae et al.

(10) Patent No.: US 9,295,061 B2
(45) Date of Patent: Mar. 22, 2016

(54) METHOD OF SELECTING TRANSMISSION PARAMETER AND DYNAMIC SPECTRUM ALLOCATION APPARATUS

(71) Applicant: RESEARCH & BUSINESS FOUNDATION SUNGKYUNKWAN UNIVERSITY, Suwon-si (KR)

(72) Inventors: Keunhong Chae, Suwon-si (KR); Seokho Yoon, Suwon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 55 days.

(21) Appl. No.: 14/339,654

(22) Filed: Jul. 24, 2014

(65) Prior Publication Data

US 2015/0029961 A1 Jan. 29, 2015

(30) Foreign Application Priority Data

Jul. 24, 2013 (KR) .................. 10-2013-0087117

(51) Int. Cl.

| H04W 72/04 | (2009.01) |
|---|---|
| H04W 28/20 | (2009.01) |
| H04L 12/24 | (2006.01) |
| H04B 1/713 | (2011.01) |
| H04B 1/69 | (2011.01) |
| H04W 72/08 | (2009.01) |
| H04W 72/02 | (2009.01) |
| H04L 27/26 | (2006.01) |

(52) U.S. Cl.
CPC ............ *H04W 72/0453* (2013.01); *H04B 1/69* (2013.01); *H04B 1/713* (2013.01); *H04L 41/0896* (2013.01); *H04W 28/20* (2013.01); *H04W 72/02* (2013.01); *H04W 72/085* (2013.01); *H04L 27/2601* (2013.01)

(58) Field of Classification Search
None
See application file for complete search history.

(56) References Cited

U.S. PATENT DOCUMENTS

| 2010/0232380 A1* | 9/2010 | Choi | H04W 72/082 370/329 |
|---|---|---|---|
| 2012/0063590 A1* | 3/2012 | Dortschy | H04B 3/487 379/406.01 |
| 2014/0214742 A1* | 7/2014 | Chester | G06N 5/043 706/46 |

* cited by examiner

*Primary Examiner* — Ashley Shivers
(74) *Attorney, Agent, or Firm* — NSIP Law

(57) ABSTRACT

A method of selecting a transmission parameter and a spectrum allocation apparatus are provided. The method of selecting a transmission parameter involves collecting frequency band information comprising a frequency bandwidth and communication environment information comprising a power density of noise, constituting a plurality of single-objective fitness functions comprising a bandwidth fitness function based on data transmission using two frequency bands, using the frequency band information and the communication environment information, constituting a multi-objective fitness function obtained by assigning a weight value to each of the plurality of single-objective fitness functions, and selecting the transmission parameter by applying a genetic algorithm to the multi-objective fitness function.

17 Claims, 5 Drawing Sheets

METHOD OF SELECTING TRANSMISSION PARAMETER AND DYNAMIC SPECTRUM ALLOCATION APPARATUS

CROSS-REFERENCE TO RELATED APPLICATION

This application claims the benefit under 35 USC 119(a) of Korean Patent Application No. 10-2013-0087117 filed on Jul. 24, 2013, in the Korean Intellectual Property Office, the entire disclosure of which is incorporated herein by reference for all purposes.

BACKGROUND

1. Field

The following description relates to a method of selecting a transmission parameter in a dynamic spectrum allocation scheme and an apparatus of allocating a dynamic spectrum using the same.

2. Discussion of Related Art

In accordance with the rapid development of radio communication systems and the emergence of a variety of services, wireless resource demands are rapidly increasing. However, frequencies of radio resources available for use are strictly limited by governments as public property, and many frequency bands are already in use. Thus, the availability of radio resource limits the application of a new radio data communication system.

Frequencies have been allocated to solve such problems, but cognitive radio (CR) technology that detects the frequency that is not actually being used to efficiently share and use the detected frequency has been developed. The CR technology refers to a technique of dynamically using an unused frequency spectrum, and thereby may be referred to as dynamic spectrum access (DSA) technology.

In the CR technology, when a primary user uses a frequency band that is being used by a CR system even in the case in which frequency resources are secured and used by the cognitive radio system, it may cause interference to the primary user. Thus, the frequency band may be unavailable to the primary user, causing inconvenience. Thus, there is a demand to develop a CR technology that provides seamless services to a secondary user while providing consistent services to the primary user without interference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of selecting a transmission parameter by a dynamic spectrum allocation apparatus involves: collecting, by the dynamic spectrum allocation apparatus, frequency band information comprising a frequency bandwidth and communication environment information comprising a power density of noise; constituting, by the dynamic spectrum allocation apparatus, a plurality of single-objective fitness functions comprising a bandwidth fitness function based on data transmission using two frequency bands, using the frequency band information and the communication environment information; constituting, by the dynamic spectrum allocation apparatus, a multi-objective fitness function obtained by assigning a weight value to each of the plurality of single-objective fitness functions; and selecting, by the dynamic spectrum allocation apparatus, the transmission parameter by applying a genetic algorithm to the multi-objective fitness function. The collecting of the frequency band information and the communication environment information may be performed using an antenna of the dynamic spectrum allocation apparatus by performing spectrum sensing.

The bandwidth fitness function ($f_{band}$) may be defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes a bandwidth of a secondary user, $B_{s,min}$ denotes a minimum value of the bandwidth of the secondary user, and $B_{s,max}$ denotes a maximum value of the bandwidth of the secondary user.

The plurality of single-objective fitness functions may include the bandwidth fitness function ($f_{band}$), a bit error rate (BER) fitness function ($f_{ber}$) for minimizing a BER, a transmission rate fitness function ($f_{throughput}$) for maximizing a transmission rate based on a guard interval of orthogonal frequency division multiplexing (OFDM) signals, and an interference fitness function ($f_{interference}$) for minimizing interference based on the guard interval of the OFDM signals.

The bandwidth fitness function may be defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes a bandwidth of a secondary user, and $B_{s,min}$ denotes a minimum value of the bandwidth of secondary user.

The BER fitness function may be defined by the following Equation:

$$f_{ber} = \frac{\log_{10}(0.5) - \log_{10}(P_b)}{\log_{10}(0.5) - \log_{10}(P_{b,min})}$$

where, $P_b$ denotes the BER, and $P_{b\_min}$ denotes a minimum value of the BER.

The transmission rate fitness function may be defined by the following Equation:

$$f_{throughput} = \left(\frac{N_{FFT}}{N_{FFT} + N_G}\right)\left\{\frac{\log_2(M) - \log_2(M_{min})}{\log_2(M_{max}) - \log_2(M_{min})}\right\}$$

where, $N_{FFT}$ denotes a length of an FFT, $N_G$ denotes a length of the guard interval, M denotes a modulation index, $M_{min}$ denotes a minimum value of the modulation index, and $M_{max}$ denotes a maximum value of the modulation index.

The interference fitness function may be defined by the following Equation:

$$f_{interference} = 1 - \frac{1}{2}\left(\frac{N_{FFT} + N_G}{N_{FFT}}\right)\left\{\left(\frac{P_s - P_{s,min}}{P_{s,max} - P_{s,min}}\right) + \left(\frac{B_s - B_{s,min}}{B - B_{s,min}}\right)\right\}$$

where, $N_{FFT}$ denotes a length of an FFT, $N_G$ denotes a length of the guard interval, B denotes a sum of bandwidths for selected bands, $B_{s,min}$ denotes a minimum value of a bandwidth of a secondary user, $P_s$ denotes a transmission power of the secondary user, $P_{s,min}$ denotes a minimum value of the transmission power of the secondary user, and $P_{s,max}$ denotes a maximum value of the transmission power of the secondary user.

The multi-objective fitness function may be constituted by assigning the weight value (w) to each of the plurality of single-objective fitness functions as shown in the following Equation:

$$f_{multiple} = w_1 f_{band} + w_2 f_{ber} + w_3 f_{throughput} + w_4 f_{interference}$$

and a sum of all of the weight values may be 1.

In another general aspect, there is provided an apparatus for spectrum allocation, the apparatus including an environmental measuring unit configured to collect frequency band information comprising a frequency bandwidth and communication environment information comprising a power density of noise; a fitness function generating unit configured to generate a plurality of single-objective fitness functions comprising a bandwidth fitness function ($f_{band}$) based on data band, transmission using two frequency bands, a BER fitness function ($f_{ber}$) for minimizing a BER, a transmission rate fitness function ($f_{throughput}$) for maximizing a transmission rate based on a guard interval of OFDM signals, and an interference fitness function ($f_{interference}$) for minimizing interference based on the guard interval of the OFDM signals, using the frequency band information and the communication environment information; and a transmission parameter selecting unit configured to set at least one of a transmission power of a secondary user, a bandwidth of the secondary user, a modulation index of the secondary user, and a modulation scheme of the secondary user, by applying a genetic algorithm to the multi-objective fitness function.

The environmental measuring unit may include an antenna that is configured to collect the frequency band information and the communication environment information by performing spectrum sensing.

The bandwidth fitness function may be defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes the bandwidth of the secondary user, $B_{s,min}$ denotes a minimum value of the bandwidth of secondary user, and $B_{s,max}$ denotes a maximum value of the bandwidth of the secondary user.

The BER fitness function may be defined by the following Equation:

$$f_{ber} = \frac{\log_{10}(0.5) - \log_{10}(P_b)}{\log_{10}(0.5) - \log_{10}(P_{b,min})}$$

where, $P_b$ denotes the BER, and $P_{b\_min}$ denotes a minimum value of the BER.

The transmission rate fitness function may be defined by the following Equation:

$$f_{throughput} = \left(\frac{N_{FFT}}{N_{FFT} + N_G}\right)\left\{\frac{\log_2(M) - \log_2(M_{min})}{\log_2(M_{max}) - \log_2(M_{min})}\right\}$$

where, $N_{FFT}$ denotes a length of FFT, $N_G$ denotes a length of the guard interval, M denotes the modulation index, $M_{min}$ denotes a minimum value of the modulation index, and $M_{max}$ denotes a maximum value of the modulation index.

The interference fitness function may be defined by the following Equation:

$$f_{interference} = 1 - \frac{1}{2}\left(\frac{N_{FFT} + N_G}{N_{FFT}}\right)\left\{\left(\frac{P_s - P_{s,min}}{P_{s,max} - P_{s,min}}\right) + \left(\frac{B_s - B_{s,min}}{B - B_{s,min}}\right)\right\}$$

where, $N_{FFT}$ denotes a length of an FFT, $N_G$ denotes a length of the guard interval, B denotes a sum of bandwidths for selected bands, $B_{s,min}$ denotes a minimum value of a bandwidth of the secondary user, $P_s$ denotes the transmission power of the secondary user, $P_{s,min}$ denotes a minimum value of the transmission power of the secondary user, and $P_{s,max}$ denotes a maximum value of the transmission power of the secondary user.

The multi-objective fitness function may be constituted by assigning the weight value (w) to each of the plurality of single-objective fitness functions as shown in the following Equation:

$$f_{multiple} = w_1 f_{band} + w_2 f_{ber} + w_3 f_{throughput} + w_4 f_{interference}$$

and a sum of all of the weight values is 1.

In another general aspect, there is provided a non-transitory computer readable medium storing instructions that causes a terminal to perform the method described above.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Main communication performance indexes such as a transmission rate, a bit error rate (BER), and the like may be dependent on transmission parameters and environmental measurement values. The transmission parameters are values that can be adjusted by a secondary user. The environmental measurement values are values that reflect a corresponding communication environment, and thereby cannot be adjusted by a secondary user within the same communication environment.

In following disclosure relates to a method of adjusting the transmission parameter that can be adjusted by the secondary user through which the communication performance is determined to achieve the desired communication performance of the secondary user.

As examples of the transmission parameters include a transmission power of the secondary user, a bandwidth of the secondary user, a modulation index of the secondary user, a modulation scheme, and the like. And more efficient communication performance such as a high data transmission rate, a low BER, less interference to a primary user can be obtained by considering the dynamically changing environment and using the transmission parameter that are suitable for the purpose.

An example of the method of adjusting the transmitter involves designing fitness functions based on carrier aggregation (CA) and an orthogonal frequency division multiplexing (OFDM) system that has a guard interval in signals. In addition, the method involves selecting transmission parameters using the designed fitness functions.

Hereinafter, a method of selecting a transmission parameter and a dynamic spectrum allocation apparatus will be described in detail with reference to the accompanying drawings.

Figure 1:
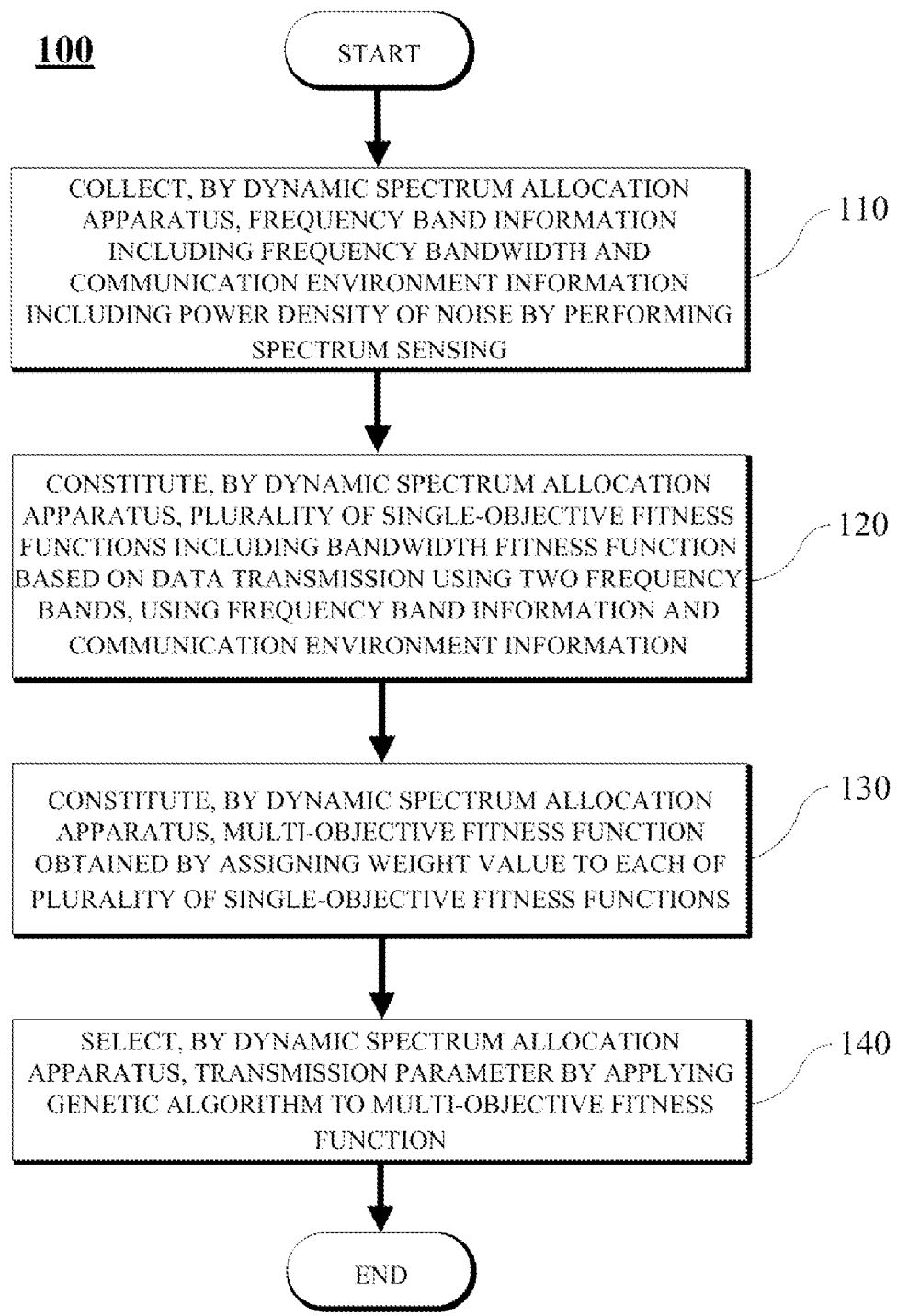
FIG. 1 is a flowchart illustrating an example of a method of selecting a transmission parameter.

FIG. 1 illustrates a flowchart of an example of a method of selecting a transmission parameter.

Referring to FIG. 1, the method of selecting the transmission parameter includes collecting, by the dynamic spectrum allocation apparatus, frequency band information including a frequency bandwidth and communication environment information including a power density of noise by performing spectrum sensing (110); constituting, by the dynamic spectrum allocation apparatus, a plurality of single-objective fitness functions including a bandwidth fitness function based on data transmission using two frequency bands, and using the frequency band information and the communication environment information (120), constituting, by the dynamic spectrum allocation apparatus, a multi-objective fitness function obtained by assigning a weight value to each of the plurality of single-objective fitness functions (130), and selecting, by the dynamic spectrum allocation apparatus, the transmission parameter by applying a genetic algorithm to the multi-objective fitness function (140).

The method 100 of selecting the transmission parameter includes information about frequency bands and other communication environment information by performing spectrum sensing or the like in order to obtain information about a peripheral communication environment. As a method of collecting the communication environment information, a variety of methods that are well known in the related art may be used, including the use of an antenna, a transmission receiver and the like that is provided in a terminal. The information about frequency bands and the other communication environment information include a bandwidth of each band and a power density of noise. The information about frequency bands and the other communication environment information may be used as parameters constituting a fitness function.

The plurality of single-objective fitness functions may include a bandwidth fitness function ($f_{band}$), a BER fitness function ($f_{ber}$) for minimizing a BER, a transmission rate fitness function ($f_{throughput}$) for maximizing a transmission rate based on a guard interval of orthogonal frequency division multiplexing (OFDM) signals, and an interference fitness function ($f_{interference}$) for minimizing interference based on the guard interval of the OFDM signals.

The bandwidth fitness function ($f_{band}$) is based on the above-described CA technology, and used for transmitting data in a wider bandwidth in one or two frequency bands of a wide bandwidth. The bandwidth fitness function ($f_{band}$) may be represented as the following Equation 1.

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\} \quad \text{[Equation 1]}$$

B denotes a sum of bandwidths for selected bands, $B_{min}$ denotes a minimum value of the sum of bandwidths for selected bands, $B_{max}$ denotes a maximum value of the sum of bandwidths for selected bands, $B_s$ denotes a bandwidth of a secondary user, $B_{s,min}$ denotes a minimum value of the bandwidth of a secondary user, and $B_{s,max}$ denotes a maximum value of the bandwidth of the secondary user. The secondary user may be a terminal, such as a mobile terminal, a cellular phone, a smart phone, a wearable smart device, a personal computer, a tablet personal computer, a global positioning system navigation, and the like.

By selecting and using one or two bands rather than selecting one band, a greater amount of bandwidth may be utilized.

Equation 1 is the single-objective fitness function concerning which narrow band is selected when there are several narrow bands and what amount of transmission bandwidth is to be used in the selected narrow band. The criterion for the selection of the narrow band is a bandwidth of a narrow band.

In Equation 1, a first term in the brackets is normalized to have '1' when selecting the narrow band having the greatest bandwidth and have '0' when selecting the narrow band having the smallest bandwidth. In addition, in Equation 1, a second term in the brackets is normalized to have '1' when transmitting data in the widest transmission bandwidth and have '0' when transmitting data in the narrowest bandwidth. A maximum transmission bandwidth is a bandwidth of the selected narrow band.

In Equation 1, in order to use a wide transmission bandwidth while selecting the narrow band with a great bandwidth, an addition operation of each term is performed. Since each of the two terms has a value ≥0 and ≤1, a sum of the two terms has a range of 0 to 2, and in order to normalize this, the sum of the two terms is divided by 2.

In order for one or two narrow bands to be selected, the number of a narrow band to be additionally selected is added to a transmission parameter indicating the number of an existing narrow band, as the transmission parameter. When selecting the same narrow band as the existing narrow band from the transmission parameter to be additionally selected, the bandwidth of the existing selected narrow band may be used, and when selecting a narrow band different from the existing narrow band, a sum of bandwidths of each narrow band may be used as an available bandwidth.

$$B = \sum_{k \in K} B(k) \qquad \text{[Equation 2]}$$

B(k) denotes a bandwidth of a k-th band, and K denotes a set having the number of the selected narrow band as an element.

The fitness function ($f_{ber}$) for minimizing the BER may be represented as the following Equation 3.

$$f_{ber} = \frac{\log_{10}(0.5) - \log_{10}(P_b)}{\log_{10}(0.5) - \log_{10}(P_{b,min})} \qquad \text{[Equation 3]}$$

$P_b$ denotes a BER, and $P_{b\_min}$ denotes a minimum value of the BER.

The BER is determined in accordance with a modulation scheme, a modulation index, and $E_b/N_0$ which may be represented as the following Equation 4.

$$\frac{E_b}{N_0} = \frac{P_s}{2\log_2(M) B_s N_0} \qquad \text{[Equation 4]}$$

$E_b$ denotes bit energy, and $N_0$ denotes a power density of noise. In addition, $P_s$ denotes a transmission power of a secondary user, $B_s$ denotes a bandwidth of the secondary user, and M denotes a modulation index.

The transmission rate fitness function ($f_{throughput}$) for maximizing the transmission rate based on the guard interval of OFDM signals may be represented as the following Equation 5.

$$f_{throughput} = \left(\frac{N_{FFT}}{N_{FFT} + N_G}\right)\left\{\frac{\log_2(M) - \log_2(M_{min})}{\log_2(M_{max}) - \log_2(M_{min})}\right\} \qquad \text{[Equation 5]}$$

$N_{FFT}$ denotes a length of an FFT, and $N_G$ denotes a length of the guard interval. In addition, M denotes a modulation index, $M_{min}$ denotes a minimum value of the modulation index, and $M_{max}$ denotes a maximum value of the modulation index.

The transmission rate is the number of bits per symbol, and this may be obtained by calculating a base 2 logarithm of the modulation index M. The base 2 logarithm is an increasing function, and therefore the number of bits per symbol is increased along with an increase in the modulation index.

In Equation 5, the inside of the brackets has a value of '1' for the maximum modulation index, and has a value of '0' for the minimum modulation index.

Here, in the OFDM system, the guard interval is used to prevent interference between adjacent symbols, but the guard interval is not an actual data portion and thereby meaningless in terms of data transmission. Thus, Equation 5 is obtained by multiplying a formula of maximization of the normalized transmission rate by a ratio (parentheses) of a data portion to the whole length (FFT length+guard interval length).

The interference fitness function ($f_{interference}$) for minimizing interference based on the guard interval of the OFDM signals may be represented as the following Equation 6.

$$f_{interference} = \qquad \text{[Equation 6]}$$
$$1 - \frac{1}{2}\left(\frac{N_{FFT} + N_G}{N_{FFT}}\right)\left\{\left(\frac{P_s - P_{s,min}}{P_{s,max} - P_{s,min}}\right) + \left(\frac{B_s - B_{s,min}}{B - B_{s,min}}\right)\right\}$$

$P_s$ denotes a transmission power of the secondary user, $P_{s,min}$ denotes a minimum value of the transmission power of the secondary user, and $P_{s,max}$ denotes a maximum value of the transmission power of the secondary user.

Equation 6 is a single-objective fitness function for interference minimization with respect to the primary user. An amount of interference to the primary user is increased along with an increase in the transmission power and the transmission bandwidth that are used by the secondary user. Thus, the transmission power and the transmission bandwidth that are used by the secondary user are normalized to have a value of '0' to '1'. In order to consider the transmission power of the secondary user together with the transmission bandwidth of the secondary user, these normalized two terms are given as a sum thereof.

Since a sum of the terms of the transmission power and the transmission bandwidth of the secondary user has a range of '0' to '2', a range of '0' to '1' is obtained by dividing the sum of the terms by 2, and a maximum amount of interference is obtained when the sum is '1' and a minimum amount of interference is obtained when the sum is '0'.

Equation 6 is used to minimize the interference to the primary user, and therefore the single-objective fitness function for minimizing the interference to the primary user is designed in the form of subtracting the formula indicating an amount of interference from '1' that is the maximum value of the fitness function.

The multi-objective fitness function ($f_{multiple}$) is obtained by multiplying, by a weight, each of the single-objective fitness functions represented as Equations 1, 3, 5, and 6.

The multi-objective fitness function ($f_{multiple}$) may be represented as the following Equation 7.

$$f_{multiple} = w_1 f_{band} + w_2 f_{ber} + w_3 f_{throughput} + w_4 f_{interference} \qquad \text{[Equation 7]}$$

Weights used in the multi-objective fitness function may be represented as the following Equation 8 as a weight vector w, and a sum of the respective weights is '1' as shown in the following Equation 9.

$$W = [w_1, w_2, w_3, w_4] \quad \text{[Equation 8]}$$

$$\sum_{i=1}^{N} w_i = 1, \ 0 \le w_i \le 1 \quad \text{[Equation 9]}$$

The N denotes the number of single-objective fitness functions.

Figure 2:
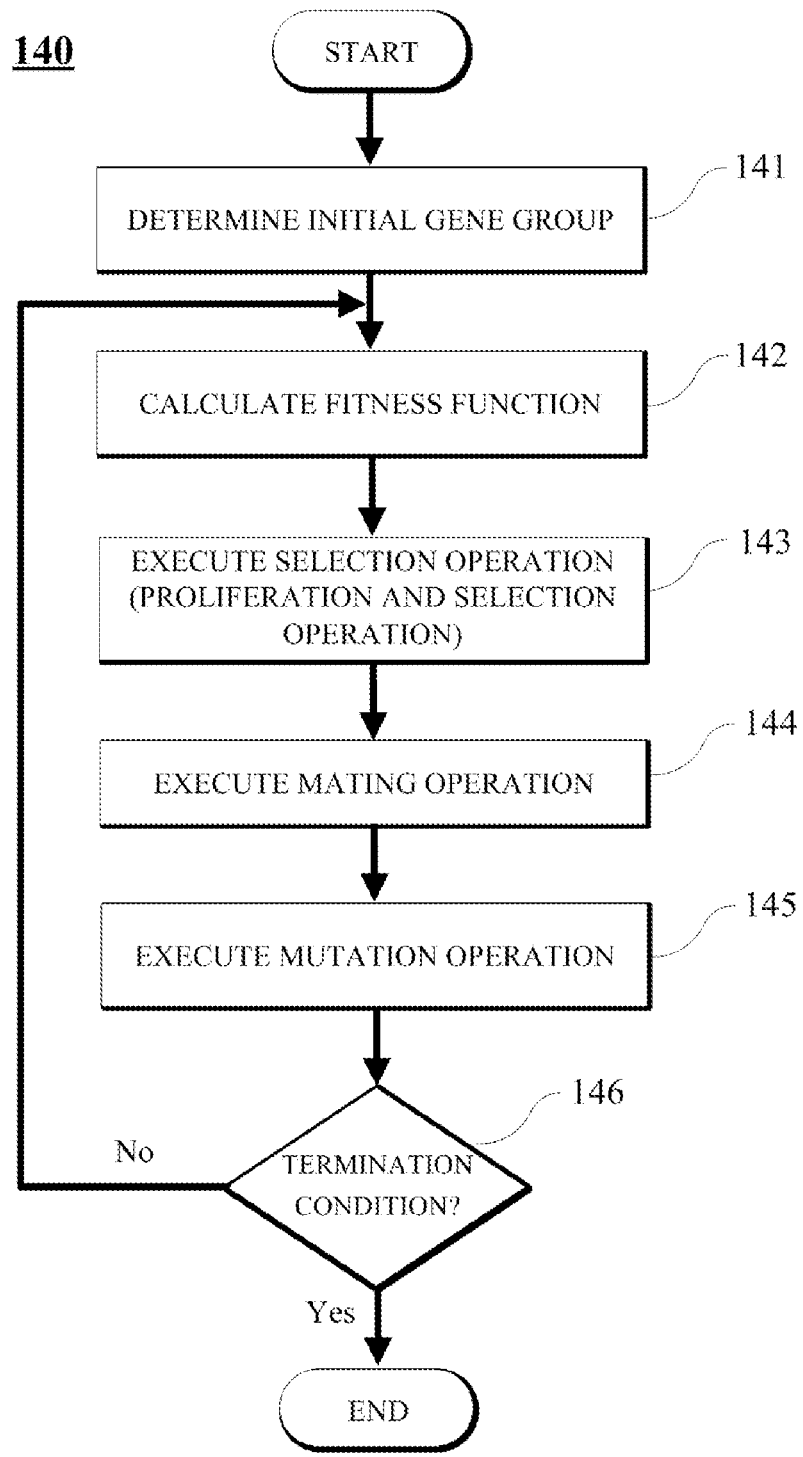
FIG. 2 is a flowchart illustrating an example of a process of performing a genetic algorithm.

FIG. 2 illustrates a flowchart of an example of a process of performing a genetic algorithm.

In the genetic algorithm 140, a solution set using a set of the transmission parameters as a single candidate solution is referred to as population. In the genetic algorithm, an initial gene group that is such a solution set is determined in operation 141. Next, the genetic algorithm is repeatedly performed until fitness function value calculation 142, selection operation 143, mating operation 144, and mutation operation 145 satisfy termination conditions in 146. By executing selection operation, mating operation, and mutation operation, which are basic operations of the genetic algorithm with respect to population of a corresponding generation as the generations pass, the transmission parameter is set. Here, the selection is an operation of transmitting a corresponding candidate solution to the next generation with higher probability along with an increase in the value of the fitness function of the candidate solution, the mating operation is an operation of generating a new candidate solution by mutually exchanging a part of the selected candidate solution within the solution set, and the mutation is an operation of replacing components of the candidate solutions with the opposed components with low probability. The genetic algorithm is an algorithm that is well known by those having ordinary knowledge in the related art, and therefore detailed description thereof will be omitted.

Figure 3:
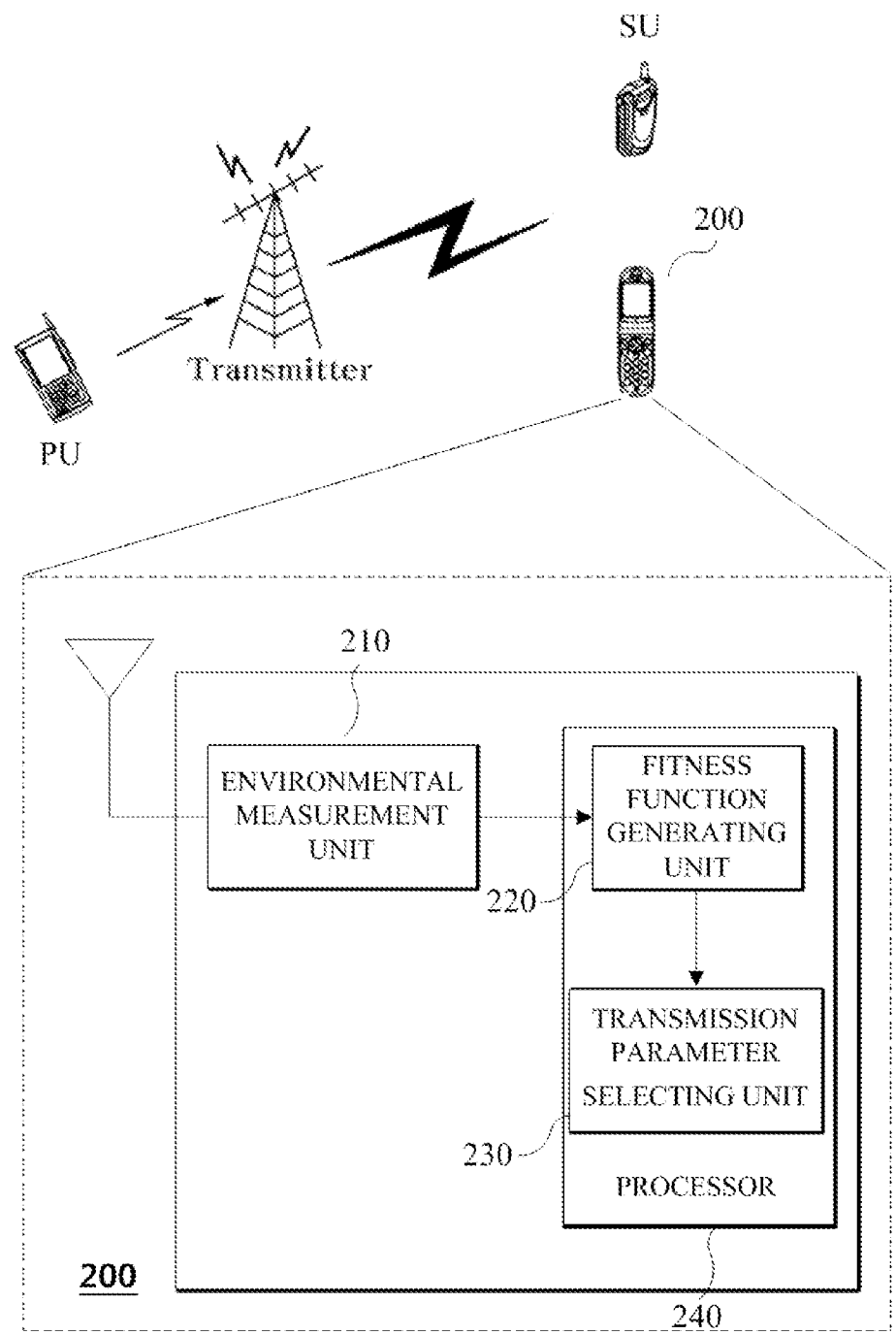
FIG. 3 is a block diagram illustrating an example of a dynamic spectrum allocation apparatus.

FIG. 3 illustrates a block diagram of an example of a dynamic spectrum allocation apparatus.

The dynamic spectrum allocation apparatus 200 may correspond to a terminal. A terminal may be a mobile device such as a cellular phone, a smart phone, a wearable smart device, a personal computer, a tablet personal computer, a global positioning system navigation, and the like. The terminal may be capable of wireless communication or network communication consistent with that disclosed herein. The terminal may include a display screen, a key board, buttons, or an input/output device such as a touch screen for inputting data and displaying data from a user. The terminal may further include a processor, a controller, a memory storage, a transceiver, a transmitter, a receiver, and the like.

A terminal may be a primary user (PU) or a secondary user (SU) within a cognitive radio network. The primary user (PU) may be transmitting or receiving data transmission with a base station. Spectrum sensing involves detecting unused spectrum, which may be used by a secondary user (SU). The detection of the presence of a primary user (PU) is an way to detect an empty spectrum. This may be performed by determining if a signal from a primary transmitter is locally present in a spectrum, for example. In the illustrated example, the dynamic spectrum allocation apparatus is a secondary user (SU).

The dynamic spectrum allocation apparatus includes an environmental measurement unit 210 that collects frequency band information including a frequency bandwidth and communication environment information including a power density of noise by performing spectrum sensing; a fitness function generating unit 220 that generates a plurality of single-objective fitness functions including a bandwidth fitness function ($f_{band}$) based on data transmission using two frequency bands, a BER fitness function ($f_{ber}$) for minimizing a BER, a transmission rate fitness function ($f_{throughput}$) for maximizing a transmission rate based on a guard interval of OFDM signals, and an interference fitness function ($f_{interference}$) for minimizing interference based on the guard interval of the OFDM signals, using the frequency band information and the communication environment information; and a transmission parameter selecting unit 230 that sets at least one of a transmission power of a secondary user, a bandwidth of the secondary user, a modulation index of the secondary user, and a modulation scheme of the secondary user by applying a genetic algorithm to a multi-objective fitness function. The environmental measurement unit 210 may include an antenna, a transmission receiver or a transceiver to collect the frequency band information including the frequency bandwidth and the communication environment information including the power density of noise. In the illustrated example, the environmental measurement unit 210 includes an antenna.

The fitness function generating unit 220 generates the above-described multi-objective fitness function using the plurality of single-objective fitness functions. The fitness function generating unit 220 may include a processor or a processing device for generating the multi-objective fitness function. Descriptions of each of the single-objective fitness functions and the multi-objective fitness function are the same as above, and thus will be omitted.

The transmission parameter selecting unit 230 obtains a final solution by applying the above-described genetic algorithm to the multi-objective fitness function. The transmission parameter selecting unit 230 may include a processor or a processing device for applying the above-described genetic algorithm to the multi-objective fitness function to obtain the final solution. In the illustrated example, the fitness function generating unit 220 and the transmission parameter selecting unit 230 are included in a processor 240.

Figure 4:
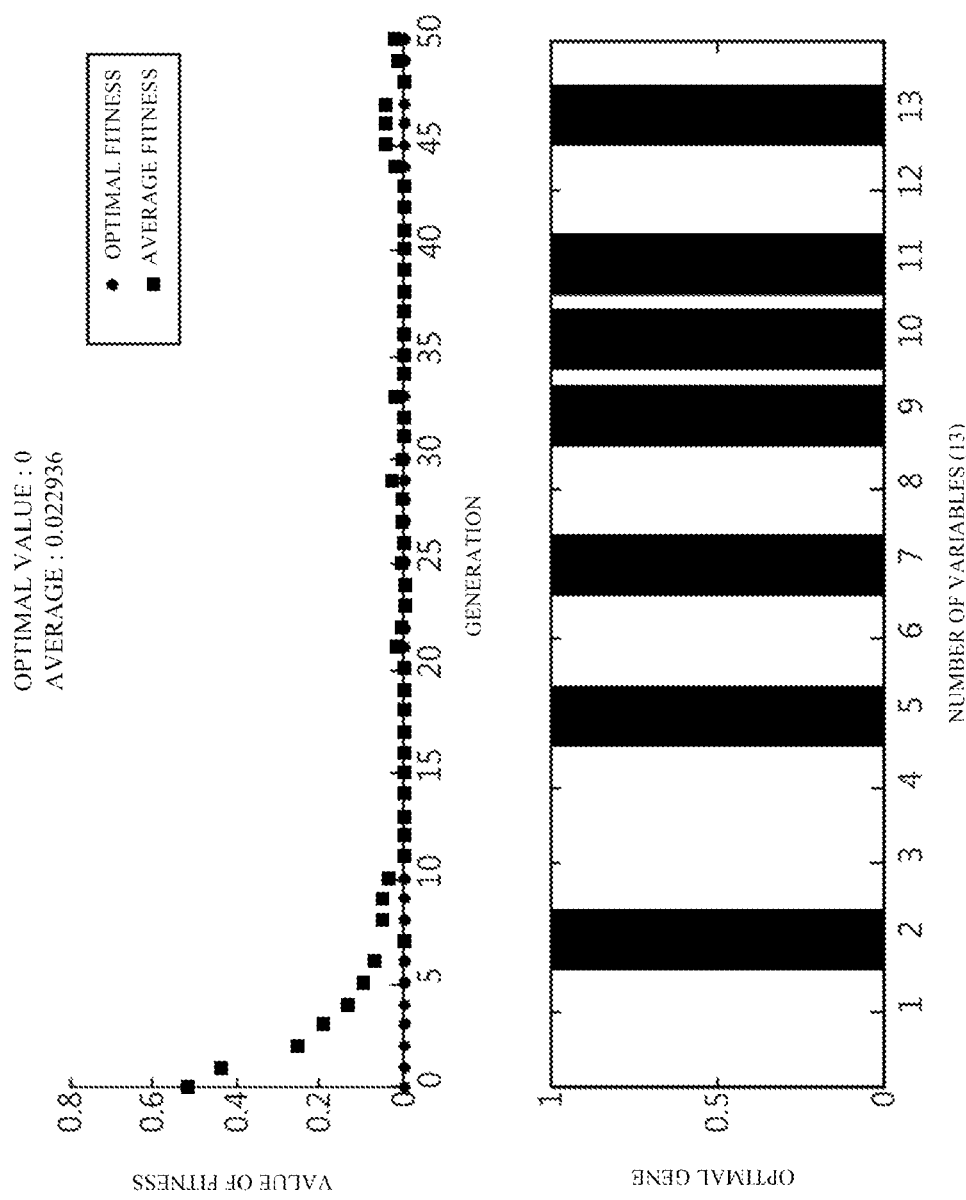
FIG. 4 is a graph illustrating an example of simulation results for transmission parameter selection based on carrier aggregation (CA) technology.
Figure 5:
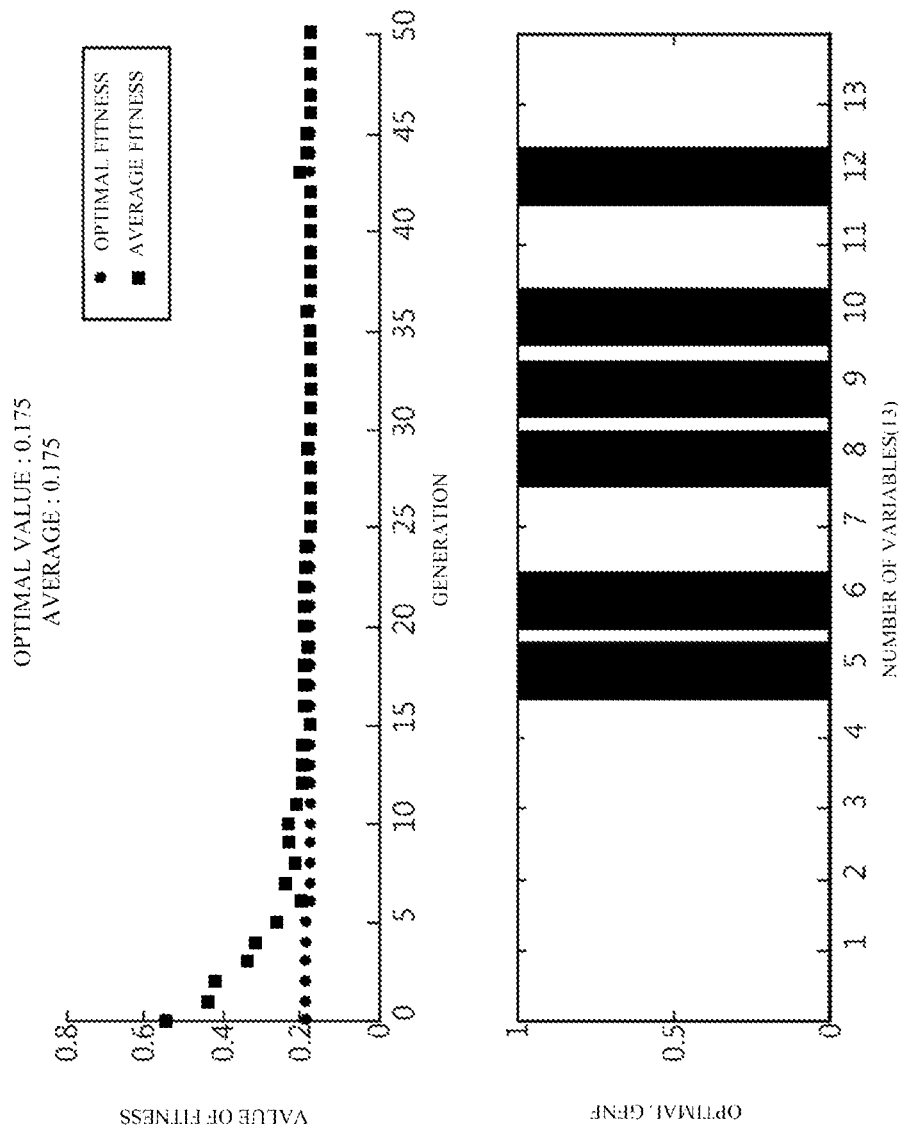
FIG. 5 is a graph illustrating an example of simulation results for a transmission parameter selecting in which a weight value of a multi-objective fitness function is w=[0.7, 0.1, 0.1, 0.1].

For the purpose of performance evaluation of the method of selecting the transmission parameter according to the example described above, a transmission parameter selecting simulation using MATLAB was performed. By selecting the transmission parameter as a weight vector based on each of the single-objective fitness functions and a weight vector w=[0.7, 0.1, 0.1, 0.1] obtained by assigning a high weight value to the use of a large bandwidth, the simulation was performed, and the results are shown in FIGS. 4 and 5. In the transmission parameter, the transmission power of the secondary user was in a range of 1 to 16 dBm as an interval of 1 dBm, BPSK, QPSK, 8PSK, and 16QAM were used as the modulation scheme, and four bands such as 20 kHz, 50 kHz, 100 kHz, 1000 kHz were considered. In addition, a ratio of a length of a guard interval to a length of a data interval was ⅛ and 1/16 as the transmission bandwidth of the secondary user.

FIG. 4 illustrates a graph of an example of simulation results for transmission parameter selecting based on carrier aggregation (CA) technology, and FIG. 5 illustrates a graph of an example of simulation results for a transmission parameter selecting in which a weight value of a multi-objective fitness function is w=[0.7, 0.1, 0.1, 0.1].

A transmission parameter solution set for being applied to the genetic algorithm is as follows: The transmission power of the secondary user of 1 to 16 dBm as an interval of 1 dBm was set as a 4-digit binary number from '0000' to '1111'. In addition, the modulation schemes are BPSK, QPSK, 8PSK, and 16QAM, the bands are 20 kHZ, 50 kHZ, 100 kHz, and 1000 kHZ, and a used bandwidth ratio of the selected bands of 1 kHZ, B/4, B/2, and B were set as a 2-digit binary number from '00' to '11' as parameters used to determine whether to select another band from '0' to '3'. In addition, the ratio of the length of the guard interval to the length of the data interval of ⅛ and ¹⁄₁₆ was allocated as a one-digit binary number. Accordingly, the solution set was represented as a total of 13-digit binary number in the following order such as the transmission power of the secondary user, the modulation scheme, the available frequency band, the ratio of the bandwidth used by the secondary user in the selected band, the ratio of the length of the guard interval to the length of the data interval, and the parameters used in selection of one or two bands.

In the graphs showing the simulation results of FIGS. 4 and 5, a horizontal axis indicates generations, and a vertical axis indicates values of the fitness function. In a case of an optimization tool provided in MATLAB, optimization is performed in a direction in which the value of the fitness function is minimized, and therefore the value of the fitness function appears closer to '0' rather than closer to '1'.

When simulation is performed in order to align in the direction in which optimization is performed, a function obtained by subtracting the designed fitness function from '1' is applied as the fitness function. Referring to FIGS. 4 and 5, it can be confirmed that the transmission parameter is set by applying the genetic algorithm as the generations pass, from a reduction in the value of the fitness function.

In the lower graphs of FIGS. 4 and 5, the presence of a blue bar indicates '1' in the corresponding position, and absence of the blue bar indicates '0' in the corresponding position.

From the left side of the lower graph of FIG. 4, the seventh digit, the eighth digit, the ninth digit, the tenth digit, the $12^{th}$ digit, and the $13^{th}$ digit are associated with the single-objective fitness function for transmitting data in a wide bandwidth in one or two frequency bands with a wide bandwidth. Bands are selected by respectively associating the binary numbers 00, 01, 10, and 11 which are constituted of the seventh and eighth digits, with bands with bandwidths of 20, 50, 100, and 1000 kHz. By respectively associating, with bands with the bandwidths of 20, 50, 100, and 1000 kHz, binary numbers 00, 01, 10, and 11 which are the remainder obtained by dividing a sum of the binary number constituted of the seventh digit and the eighth digit and the binary number constituted of the $12^{th}$ digit and the $13^{th}$ digit by a binary number 100 that is the number of all bands, bands are selected. Here, when the binary number constituted of the $12^{th}$ digit and the $13^{th}$ digit is 00, the previously selected band is the same as the additionally selected band, and therefore it indicates a case of selecting only one band.

From FIG. 4, it can be seen that the third band with the bandwidth of 100 kHz is selected from the seventh digit and the eighth digit, the bandwidths used by the secondary user are all used from the ninth digit and the tenth digit, and the band with the bandwidth of 1000 kHz is additionally selected from the $12^{th}$ digit and the $13^{th}$ digit. These results are consistent with the purpose of the single-objective fitness function for transmitting data in a wide bandwidth in one or two frequency bands with a wide bandwidth.

FIG. 5 illustrates simulation results for a transmission parameter selecting when a weight value of a multi-objective fitness function is w=[0.7, 0.1, 0.1, 0.1]. From FIG. 5, it can be seen that the band with the bandwidth of 50 kHz is selected from the seventh digit and the eighth digit, the band with the bandwidth of 1000 kHz is selected from the $12^{th}$ digit and the $13^{th}$ digit, and the entire bandwidth of the band selected from the ninth digit and the tenth digit is used by the secondary user. In addition, it can be seen that the transmission power of the secondary user is set as a minimum value of 1 dBm from the first digit, the second digit, the third digit, and the fourth digit, 16 QAM is set from the fifth digit and the sixth digit, and the ratio of the length of the guard interval to the length of the data interval is set as ¹⁄₁₆ from the eleventh digit. That is, since a weight value of the single-objective fitness function for transmitting data in the wide bandwidth in one or two frequency bands with a wide bandwidth is the greatest, a total of 1050 kHz is used as the transmission bandwidth of the secondary user, and since interference of the secondary user is increased due to the large bandwidth, the transmission power of the secondary user is set as the minimum value.

In addition, in a case of 16QAM, a BER is degraded compared to other modulation schemes, but 16QAM has an advantage of a high data transmission rate based on the data transmission rate and the ratio of the length of the guard interval to the length of the data interval set as ¹⁄₁₆.

As described above, according to the example of the method, the transmission parameter may be set based on CA technology of transmitting data by selecting one or two bands and the guard interval of the OFDM system. Consequently, the method may provide communication performance more suitable for the OFDM system.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A terminal may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

The various units and modules described above may be implemented using one or more hardware components. The hardware component may be, for example, a physical device that physically performs one or more operations, but is not limited thereto. Examples of the hardware components include microphones, antenna, receiver, amplifiers, low-pass filters, high-pass filters, band-pass filters, analog-to-digital converters, digital-to-analog converters, and processing devices.

A computer, controller, or other control device may cause the processing device to run software or execute instructions. One software component may be implemented by one processing device, or two or more software components may be implemented by one processing device, or one software component may be implemented by two or more processing devices, or two or more software components may be implemented by two or more processing devices.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of selecting a transmission parameter by a dynamic spectrum allocation apparatus, the method comprising:

collecting, by the dynamic spectrum allocation apparatus, frequency band information comprising a frequency bandwidth and communication environment information comprising a power density of noise;

constituting, by the dynamic spectrum allocation apparatus, a plurality of single-objective fitness functions comprising a bandwidth fitness function based on data transmission using two frequency bands, using the frequency band information and the communication environment information;

constituting, by the dynamic spectrum allocation apparatus, a multi-objective fitness function obtained by assigning a weight value to each of the plurality of single-objective fitness functions; and selecting, by the dynamic spectrum allocation apparatus, the transmission parameter by applying a genetic algorithm to the multi-objective fitness function.

2. The method of claim 1, wherein the collecting of the frequency band information and the communication environment information is performed using an antenna of the dynamic spectrum allocation apparatus by performing spectrum sensing.

3. The method of claim 1, wherein the bandwidth fitness function ($f_{band}$) is defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes a bandwidth of a secondary user, $B_{s,min}$ denotes a minimum value of the bandwidth of the secondary user, and $B_{s,max}$ denotes a maximum value of the bandwidth of the secondary user.

4. The method of claim 1, wherein the plurality of single-objective fitness functions comprises the bandwidth fitness function ($f_{band}$), a bit error rate (BER) fitness function ($f_{ber}$) for minimizing a BER, a transmission rate fitness function ($f_{throughput}$) for maximizing a transmission rate based on a guard interval of orthogonal frequency division multiplexing (OFDM) signals, and an interference fitness function ($f_{interference}$) based on the guard interval of the interference) for minimizing OFDM signals.

5. The method of claim 4, wherein the bandwidth fitness function is defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes a bandwidth of a secondary user, and $B_{s,min}$ denotes a minimum value of the bandwidth of secondary user.

6. The method of claim 4, wherein the BER fitness function is defined by the following Equation:

$$f_{ber} = \frac{\log_{10}(0.5) - \log_{10}(P_b)}{\log_{10}(0.5) - \log_{10}(P_{b,min})}$$

where, $P_b$ denotes the BER, and $P_{b\_min}$ denotes a minimum value of the BER.

7. The method of claim 4, wherein the transmission rate fitness function is defined by the following Equation:

$$f_{throughput} = \left(\frac{N_{FFT}}{N_{FFT} + N_G}\right)\left\{\frac{\log_2(M) - \log_2(M_{min})}{\log_2(M_{max}) - \log_2(M_{min})}\right\}$$

where, $N_{FFT}$ denotes a length of an FFT, $N_G$ denotes a length of the guard interval, M denotes a modulation index, $M_{min}$ denotes a minimum value of the modulation index, and $M_{max}$ denotes a maximum value of the modulation index.

8. The method of claim 4, wherein the interference fitness function is defined by the following Equation:

$$f_{interface} = 1 - \frac{1}{2}\left(\frac{N_{FFT} + N_G}{N_{FFT}}\right)\left\{\left(\frac{P_s - P_{s,min}}{P_{s,max} - P_{s,min}}\right) + \left(\frac{B_s - B_{s,min}}{B - B_{s,min}}\right)\right\}$$

where, $N_{FFT}$ denotes a length of an FFT, $N_G$ denotes a length of the guard interval, B denotes a sum of bandwidths for selected bands, $B_{s,min}$ denotes a minimum value of a bandwidth of a secondary user, $P_s$ denotes a transmission power of the secondary user, $P_{s,min}$ denotes a minimum value of the transmission power of the secondary user, and $P_{s,max}$ denotes a maximum value of the transmission power of the secondary user.

9. The method of claim 4, wherein the multi-objective fitness function is constituted by assigning the weight value (w) to each of the plurality of single-objective fitness functions as shown in the following Equation:

$$f_{multiple} = w_1 f_{band} + w_2 f_{ber} + w_3 f_{throughput} + w_4 f_{interference}$$

and a sum of all of the weight values is 1.

10. A non-transitory computer readable medium storing instructions that causes a terminal to perform the method of claim 1.

11. An apparatus for spectrum allocation, the apparatus comprising:
an environmental measuring unit configured to collect frequency band information comprising a frequency bandwidth and communication environment information comprising a power density of noise;
a fitness function generating unit configured to generate a plurality of single-objective fitness functions comprising a bandwidth fitness function ($f_{band}$) based on data transmission using two frequency bands, a BER fitness function ($f_{ber}$) for minimizing a BER, a transmission rate fitness function ($f_{throughput}$) for maximizing a transmission rate based on a guard interval of OFDM signals, and an interference fitness function ($f_{interference}$) for minimizing interference based on the guard interval of the OFDM signals, using the frequency band information and the communication environment information; and
a transmission parameter selecting unit configured to set at least one of a transmission power of a secondary user, a bandwidth of the secondary user, a modulation index of the secondary user, and a modulation scheme of the secondary user, by applying a genetic algorithm to the multi-objective fitness function.

12. The apparatus of claim 11, wherein the environmental measuring unit comprises an antenna that is configured to collect the frequency band information and the communication environment information by performing spectrum sensing.

13. The apparatus of claim 11, wherein the bandwidth fitness function is defined by the following Equation:

$$f_{band} = \frac{1}{2}\left\{\left(\frac{B - B_{min}}{B_{max} - B_{min}}\right) + \left(\frac{B_s - B_{s,min}}{B - B_{s,min}}\right)\right\}$$

where, B denotes a sum of bandwidths for selected bands, $B_{min}$ denotes a minimum value of the sum of the bandwidths for selected bands, $B_{max}$ denotes a maximum value of the sum of the bandwidths for selected bands, $B_s$ denotes the bandwidth of the secondary user, $B_{s,min}$ denotes a minimum value of the bandwidth of secondary user, and $B_{s,max}$ denotes a maximum value of the bandwidth of the secondary user.

14. The apparatus of claim 11, wherein the BER fitness function is defined by the following Equation:

$$f_{ber} = \frac{\log_{10}(0.5) - \log_{10}(P_b)}{\log_{10}(0.5) - \log_{10}(P_{b,min})}$$

where, $P_b$ denotes the BER, and $P_{b\_min}$ denotes a minimum value of the BER.

15. The apparatus of claim 11, wherein the transmission rate fitness function is defined by the following Equation:

$$f_{throughput} = \left(\frac{N_{FFT}}{N_{FFT} + N_G}\right)\left\{\frac{\log_2(M) - \log_2(M_{min})}{\log_2(M_{max}) - \log_2(M_{min})}\right\}$$

where, $N_{FFT}$ denotes a length of FFT, $N_G$ denotes a length of the guard interval, M denotes the modulation index, $M_{min}$ denotes a minimum value of the modulation index, and $M_{max}$ denotes a maximum value of the modulation index.

16. The apparatus of claim 11, wherein the interference fitness function is defined by the following Equation:

$$f_{interference} = 1 - \frac{1}{2}\left(\frac{N_{FFT} + N_G}{N_{FFT}}\right)\left\{\left(\frac{P_s - P_{s,min}}{P_{s,max} - P_{s,min}}\right) + \left(\frac{B_s - B_{s,min}}{B - B_{s,min}}\right)\right\}$$

where, $N_{FFT}$ denotes a length of an FFT, $N_G$ denotes a length of the guard interval, B denotes a sum of bandwidths for selected bands, $B_{s,min}$ denotes a minimum value of a bandwidth of the secondary user, Ps, denotes the transmission power of the secondary user, $P_{s,min}$ denotes a minimum value of the transmission power of the secondary user, and $P_{s,max}$ denotes a maximum value of the transmission power of the secondary user.

17. The apparatus of claim 10, wherein the multi-objective fitness function is constituted by assigning the weight value (w) to each of the plurality of single-objective fitness functions as shown in the following Equation:

$$f_{multiple} = w_1 f_{band} + w_2 f_{ber} + w_3 f_{throughput} + w_4 f_{interference}$$

and a sum of all of the weight values is 1.

* * * * *